United States Patent
Clifford

(10) Patent No.: US 7,204,906 B2
(45) Date of Patent: *Apr. 17, 2007

(54) METHOD FOR LAMINATING AND FORMING A COMPOSITE LAMINATE IN A SINGLE OPERATION

(75) Inventor: David D'Arcy Clifford, Caledonia (CA)

(73) Assignee: Dofasco Inc., Hamilton, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/839,082

(22) Filed: Apr. 20, 2001

(65) Prior Publication Data

US 2002/0153094 A1 Oct. 24, 2002

(51) Int. Cl.
    *B32B 37/00* (2006.01)

(52) U.S. Cl. .................. 156/224; 156/221; 156/222; 156/242; 156/245

(58) Field of Classification Search .............. 156/224, 156/313, 221, 222, 242, 245
See application file for complete search history.

(56) References Cited

U.S. PATENT DOCUMENTS 3,340,714 A * 9/1967 Pohl et al. ................. 156/224
4,080,819 A * 3/1978 Hook et al. ................. 72/347
4,225,553 A * 9/1980 Hirota et al. ............... 264/292
5,152,047 A * 10/1992 Kojima et al. .............. 156/137
5,985,457 A * 11/1999 Clifford ..................... 156/313
6,032,504 A * 3/2000 Onat et al. .................. 72/297
6,419,774 B1 * 7/2002 Clifford ...................... 156/71

FOREIGN PATENT DOCUMENTS

JP        151216 A   *  9/1983
JP     11-151530 A   *  6/1999
JP     11-347642 A   * 12/1999
WO   WO-00/48831 A1  *  8/2000
WO     WO01 12434 A     2/2001

OTHER PUBLICATIONS

International Search Report for Dofasco Inc., International Application No. PCT/CA02/00554 Filed Apr. 19, 2002.

* cited by examiner

*Primary Examiner*—Jeff H. Aftergut
(74) *Attorney, Agent, or Firm*—Omar A. Nassif

(57) ABSTRACT

A method of laminating and forming a non-planar composite part from a pair of metal skins having an intervening paper layer in a single operation maintains a uniform pressure between die faces. The paper layer may be degassed prior to the lamination/forming process.

21 Claims, 1 Drawing Sheet

METHOD FOR LAMINATING AND FORMING A COMPOSITE LAMINATE IN A SINGLE OPERATION

TECHNICAL FIELD

The present invention relates to laminate structural panels and, more specifically, to methods of fabricating lightweight composite laminates.

BACKGROUND OF THE INVENTION

Sheet steel is used extensively to form panels. The required structural characteristics, such as stiffness, vary depending upon the specific application. When higher stiffness values are required, the steel thickness is typically increased. Increasing sheet steel thickness, however, produces a panel which is not only heavier, but also more expensive.

A number of approaches have been taken in the past to provide improved structural characteristics of panels, without substantially increasing weight or materials cost. For example, composites of steel sheets having a solid polymer core have been used in applications where sound deadening and vibration dampers are required.

In U.S. Pat. No. 5,985,457, entitled STRUCTURAL PANEL WITH KRAFT PAPER CORE BETWEEN METAL SKINS, the entire disclosure of which is incorporated herein by reference, structural panels are disclosed which are laminate structures having metals skins separated by and bonded to an intervening layer of paper. The laminates described therein have high specific stiffness.

In U.S. Pat. No. 6,171,705, entitled "IMPROVED STRUCTURAL PANEL AND METHOD OF MANUFACTURE," the entire disclosure of which is incorporated herewith, various techniques for fabricating laminates of steel and paper are described. The present invention provides several improvements to the method of simultaneously laminating and forming the composite laminates to produce shaped articles.

SUMMARY OF THE INVENTION

In one aspect the present invention provides a method of bonding thin sheets of steel to opposite surfaces of a layer of paper while simultaneously forming the layers into a desired shape. In other words, a composite laminate is created and formed to shape in a single operation.

In one embodiment, the method of the present invention includes the step of degassing a resin-impregnated paper layer prior to lamination/forming so that volatile compounds therein do not vaporize during the lamination/forming process.

The method also preferably includes the step of maintaining a precise predetermined gap between the mating surfaces of male and female forming dies during the lamination/forming operation.

In one aspect a the layers utilized to fabricate the laminate are sheet metal, with each of the sheet metal skins having s a thickness of at least about 0.005 inches, and a paper layer disposed between and bonded to the sheet metal skins. The paper layer may be impregnated with an adhesive resin which bonds the core layer directly to the skins and/or layers of adhesive may be placed between the core material and the skins.

DETAILED DESCRIPTION OF THE PREFERRED EMBODIMENTS OF THE INVENTION

Figure 1:
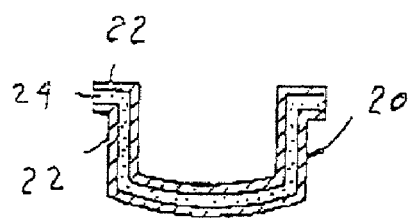
FIG. 1 is a cross-section of a laminate article formed by the method of the present invention.
Figure 3:
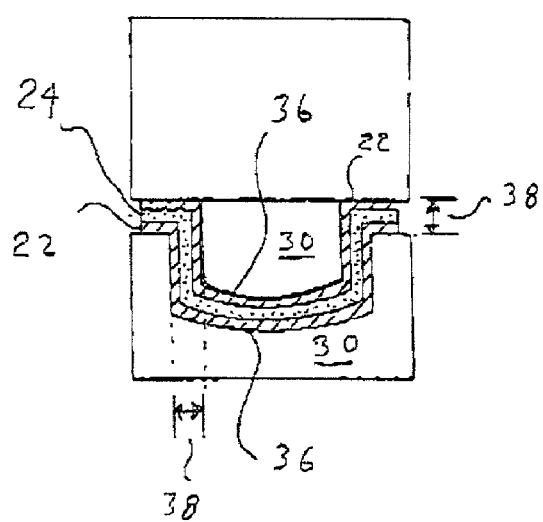
FIG. 3 is a diagram depicting the press of FIG. 2 in the closed position, maintaining a uniform gap between the mating die surfaces.

Referring now to FIG. 1 of the drawings, formed and laminated part 20 is shown having metal skins 22 and intervening fibrous core 24. It will be appreciated that part 20 has three distinct layers which cooperate to form a functional unit. The properties of his functional unit are superior to that of its individual elements as will be more fully described herein. As used herein, the term "part," including as used in reference to part 20, shall mean a non-planar article; that is, it has a geometry other than a flat sheet (i.e., stack 32 in FIG. 3 is flat; part 20 is non-planar). For illustration purposes, part 20 is shown as a hat-shaped section.

In one preferred construction, skins 22 are most preferably formed of zinc coated steel, with each layer 22 having a thickness of about 0.005 inch or greater, preferably from between about 0.007 inch and about 0.030 inch and more preferably from about 0.005 inch to about 0.012 inch in thickness. In one embodiment intervening fibrous layer 24 preferably has a thickness of from about 0.01 inch and greater and preferably from about 0.01 inch to about 0.05 inch. Thus, the overall thickness of part 20 in one embodiment will typically be between about 0.024 inch and about 0.110 inch. A part having the dimensions set forth above in the description of FIG. 1 of the drawings (a two dimensional rendering of a three dimensional part) and having the preferred layer thicknesses just described will typically have weight that is about 30–60% of the weight of the same part made from a single sheet of steel of comparable dimensions and stiffness.

The individual layers shown in FIG. 1 will now be described in more detail. As stated, metal skins 22 generally will be flat having planar surfaces on each side. Metals which may be utilized to form skins 22 are preferably selected from the group consisting of steel, aluminum, stainless steel and various combinations thereof. Metals which provide adequate structural and (if required) corrosion resistance properties in the specific environment in which part 20 is used, at the lowest cost, are most desirable. Most preferable is zinc coated sheet steel.

As will be appreciated by those skilled in the art, steel comes in a number of grades based on the amount of carbon and other elements which it contains. Broadly these grades can be described as low carbon steel, medium steel and high carbon steel. Preferred for use herein are low carbon steel and low carbon micro-alloyed high-strength steel (HSLA). The most preferred metal skins for use in the present invention are cold rolled steel, galvanized steel, tin coated steel, and stainless steel. It may be desirable to utilize single sided galvanized sheet with a galvanized surface comprising the outer surface of skins 22 with the inner surfaces of the skins being bare metal for adhesion purposes. In one embodiment differential zinc coating is preferred, i.e. a light zinc coating on the inside surface and a heavier zinc coating on the outer surface. In one embodiment, zinc coated steel is cold rolled with zinc on the surface to the final thickness.

Layer 24 is a fibrous material. Although not wishing to be bound by any theory, it is believed that the fibrous nature of layer 24 may contribute to the desirable structural characteristics of part 20, including resistance to delamination. As used herein, the term "fibrous," without limiting its scope in the context of the invention, is intended to mean a generally homogeneous collection of fibers, either natural or synthetic, which can be formed into a sheet product.

The most preferred fibrous material for use herein as layer 24, a material which is believed to be unique among fibrous sheets, is paper. As will be appreciated by those skilled in the art, paper is essentially a matted or felted structure of fibrous material formed into a relatively thin sheet through the medium of a dilute suspension of pulp and water. It is composed essentially of cellulose fibers. Pulp for paper making can be prepared by grinding wood or other plant matter mechanically, by chemical processing (sulfite, kraft, or soda) and also by chemically treating cotton, linen and hemp rags, waste, straw, and the like.

In the present invention, paper formed using the kraft process is most preferred. It will be appreciated by those skilled in the art that the kraft process (which may also be referred to as sulphate pulping or alkaline process) results in papers of high physical strength and bulk. One preferred paper is sold as saturating kraft paper, by Westvaco, of Charleston, S.C.

Also, as will be appreciated by those skilled in the art, the average alignment of cellulose fibers in paper is controlled somewhat by the "machine direction" during production of the paper. It is believed that in the present invention the orientation of the paper in the laminates is a factor which may affect the stiffness and strength of the laminate. Most preferred are laminates where the machine direction of the kraft paper is a line parallel to a neutral axis of bending of the laminate. Another class of fibrous materials which may be useful herein is plastic-fiber paper, such as high-density polyethylene fibers formed by spinning very fine fibers and then bonding them together with heat and pressure.

In one preferred embodiment of the invention, layer 24 is provided as a resin-impregnated fibrous material. Where layer 24 is kraft paper, the paper is saturated with a resin which is then dried. Most preferred for use herein is phenolic resin-impregnated kraft paper. Polyester resin impregnation may also be suitable in some applications. Methods of impregnating paper with resin will be well-known to those skilled in the art. In essence, the preferred resin-impregnated paper is formed by immersing a substrate paper web in liquid phenolic resin. Typically, layers of saturated impregnated paper are layered together to form a single layer of semi-cured impregnated paper. Other methods of impregnation include coating and spreading the resin on the paper. Although it may be suitable or desirable in specific applications to go beyond the ranges set forth hereinafter with respect to the resin content layer 24, in a preferred embodiment of the present invention resin constitutes from about 15% to about 45% by weight of resin-impregnated layer 24.

In most instances thermosetting resins are preferred for use in impregnating paper layer 24, although in some applications thermoplastic resins may be acceptable. In the case of thermosetting resins, as stated, the resin will generally be cured to B-stage prior to forming part 20, but it may be possible to fully cure the impregnated paper prior to the lamination/forming operation described below. In the case of a phenolic resin, the resin is cured to B-stage prior to lamination. It is then fully cured as skins 22 and impregnated paper core 24 are laminated together using the press. It may be suitable in some applications to include a number of standard additives in the resin such as curing agents, fillers and the like.

With or without resin impregnation of fibrous layer 24, it may be desirable or required to use a layer of adhesive to bond skins 22 to paper layer 24. A number of adhesives may be suitable in specific applications, including epoxies, phenolics, isocyanates, polyurethanes, and hot-melts. A particularly preferred adhesive for this purpose is a nitrile phenolic sold as "Arofene 1166" from Ashland Chemical. The adhesive may be applied directly to layer 24 or to metal skins 22 or both by any number of methods. It is preferred to pretreat the steel with a conversion coating such as a complex oxide or zinc phosphate to improve bond integrity and corrosion resistance.

In the present invention, an additional step has been added to the lamination/forming process; prior to lamination/forming, resin-impregnated paper layer 24 is at least partially degassed. It will appreciated that resin-impregnated paper layer 24 may have a number of volatile components such as organic solvents and the like. In addition, paper layer 24 will typically have a water content which varies depending on a number of factors such as ambient humidity. In the present invention the combined total of solvent content and water content of resin-impregnated paper layer 24 is reduced to less than about 5% of the weight of resin-impregnated layer 24 prior to lamination and more preferably to less than about 3% of the weight of resin-impregnated paper layer 24. It is to be understood that this degassing of layer 24 can be used in the lamination/forming operation of the present invention or in the lamination of flat composite panels as described in the afore-referenced pending U.S. patent applications.

Accordingly, prior to preparing stack 32 for lamination/forming, paper layer 24 is heated to between about 200° and 250° F. for about 1 to 5 minutes. Of course, these temperatures and times may vary depending on the thickness of paper layer 24, the type of solvents involved and the quantity of solvents and water present. An radiant heat oven may be used for this purpose. It is preferred that paper layer 24 be "dried" in this manner shortly before it is laminated to skins 22, but as long as the solvent/water content is within the desired ranges set forth above at the time of lamination, the objects of the invention will be satisfied.

Figure 2:
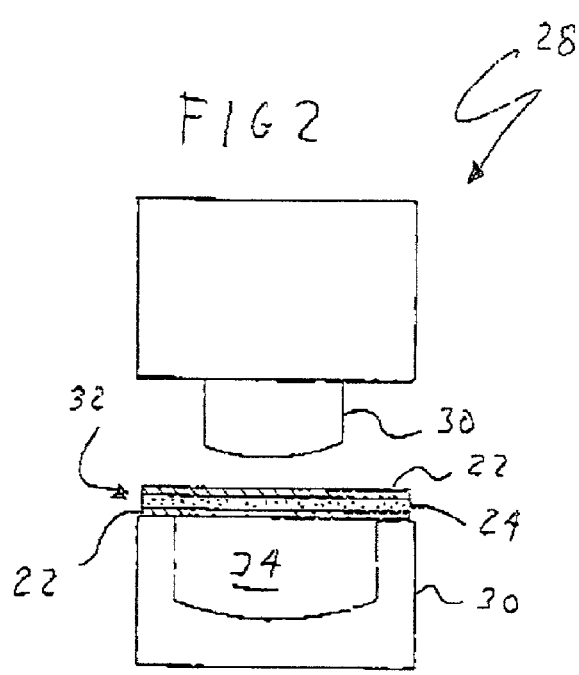
FIG. 2 is a diagram depicting a die press with stacked layers to be laminated and formed in a single operation.
Figure 4:
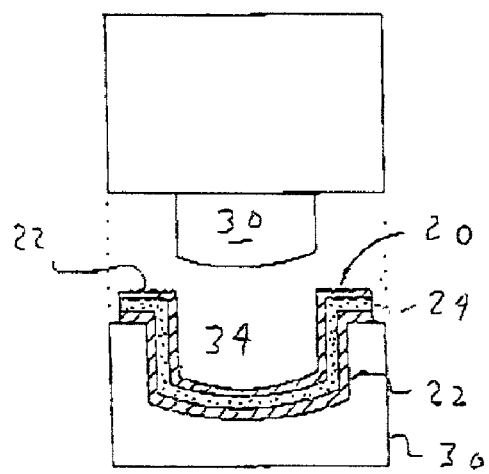
FIG. 4 is a diagram depicting the press of FIGS. 2 and 3 after the lamination/forming operation

Referring now to FIGS. 2, 3 and 4 of the drawings, the method of simultaneous lamination/forming will be described. Press 28 includes forming dies 30 which move towards one another in the customary manner using hydraulics or the like. Forming dies 30 include heating elements or the like so that both heat and pressure can be applied to the laminates to cure the resin and bond the layers together. More specifically, in FIG. 2 a metal/paper/metal stack 32 is shown positioned on die 30 having forming cavity 34. As stated above, the phenolic resin in layer 24 is at the B stage of cure prior to the press operation and heated forming dies 30 complete the cure of the phenolic resin during the pressing process. Again, in some applications it may be desirable to place an adhesive between paper layer 24 and metal skins 22.

It will be understood that from the attached figures and from the knowledge of a person skilled in the art that as the forming dies move towards each other the periphery of the stack, which is not restrained, is moved in a direction toward a center thereof in particular as the die press is closed to the forming position shown in FIG. 3.

Referring now to FIG. 3 of the drawings, press 28 closes to apply pressure to the stack. The times, temperatures and pressures will vary widely depending upon thicknesses of skins 22 and layers 24, types of resin used to impregnate layer 24, and the type of adhesive used, if any, between layer 24 and metal skins 22. Most preferably, the temperature used should be adequate to cure the phenolic resin fully and assure bonding of the adhesive layers, if any. For phenolic resin impregnated paper the temperature is preferably between about 350° F. and 400° F. in a press at 25 to 800 psi and more preferably, 300 to 500 psi. The time required with these preferred temperatures and pressures in order to form securely bonded laminates typically will be between 15 and 60 seconds. That is, heat and pressure will be applied typically for a period within this range. The reduction of solvent/water content described above helps prevent the formation of pockets along the interface of skins 22 and paper layer 24 which would otherwise interfere with the bonding process.

In the present invention, gap 38 of precise and uniform dimensions is maintained between die surfaces 36 of die 30. While metal forming does not generally require that a uniform pressure be applied at all regions of contact between die surfaces, it has been discovered that maintaining such a uniform pressure is desirable in a simultaneous lamination/forming operation for composite parts as described herein.

As best seen in FIG. 3, by maintaining close tolerances for gap 38, substantially equal pressure is applied at all regions of contact between die faces 36 and the principal surfaces of metal skins 22. Accordingly, gap 38 should not vary more than about 2% from its preselected desired value at any two points. For example, if gap 38 has a nominal width of 1 mm, the tolerance should be no more than ±0.02 mm. In terms of pressure, no two regions of article 20 should vary from one another by more than 10%.

Referring then to FIG. 4 of the drawings, when dies 30 are separated, part 20 has been both laminated (the layers are bonded together) and formed to the desired non-planar shape. Part 20 may then be removed from cavity 34.

While particular embodiments of this invention are shown and described herein, it will be understood, of course, that the invention is not to be limited thereto since many modifications may be made, particularly by those skilled in this art, in light of this disclosure. It is contemplated, therefore, by the appended claims, to cover any such modifications as fall within the true spirit and scope of this invention.

I claim:

1. A process for forming a composite part in a die press having a first die including a first non-planar surface and a second die including a second non-planar surface, the die press being operable between an open position and a forming position, the first non-planar surface and the second non-planar surface being substantially complementary to define a substantially constant gap in the forming position, the process comprising the steps of;
    disposing a composite stack in the open position, the stack comprising a pair of sheet metal skins, each of said skins having a thickness of at least about 0.005 in., and a paper layer which has been impregnated with resin disposed between and in contact with said skins of sheet metal;
    causing the die press to transition from the open position to the closed position;
    applying a uniform pressure to said stack for sufficient time to bond together said skins and said paper layer while in the same operation forming a non-planar part from said stack wherein said uniform pressure does not vary more than 10% at any two points along the surface of said stack;
    moving a periphery of said stack in a direction toward a center thereof as the die press is closed to the forming position having said uniform gap; and
    contacting substantially the entire surface of the stack with the die press.

2. The process for forming a composite part recited in claim 1, wherein said paper layer contains volatile solvents and water and further including the step of heating said paper layer prior to placing said paper layer between said metal skins in order to reduce the content of said volatile solvents and water in said paper layer.

3. The process for forming a composite part recited in claim 1, wherein said gap has a uniform width and wherein said uniform width does not vary more than about 2% at any two points along said gap.

4. The process for forming a composite part recited in claim 2, wherein the total combined quantity of volatile compounds and water in said paper layer is reduced to less than about 5% by weight of said paper layer.

5. The process for forming a composite part recited in claim 1, wherein said sheet metal is selected from to group consisting of cold rolled steel, galvanized steel, tin-coated steel and stainless steel.

6. The process for forming a composite part recited in claim 1, wherein said paper layer is adhesively bonded to said skins of sheet metal.

7. The process for forming a composite part recited in claim 1, wherein each of said skins has a thickness of from about 0.007 in. to about 0.030 in.

8. The process for forming a composite part recited in claim 1, wherein said paper layer has a thickness of at least about 0.01 in.

9. The process for forming a composite part recited in claim 1, wherein said paper layer has a thickness of from about 0.01 in. and 0.05 in.

10. The process for forming a composite part recited in claim 1, further including layers of adhesive disposed betwear said paper layer and each of said skins.

11. The process for forming composite part recited in claim 1, wherein said sheet metal skins are zinc coated steel which has been cold rolled with zinc on the surface.

12. The process for forming a composite part recited in claim 1, wherein said metal skins an formed of low carbon micro-alloyed high-strength steel.

13. The process for forming a composite part recited in claim 2, wherein said sheet metal is selected from the group consisting of cold rolled steel, galvanized steel, tin-coated steel and stainless steel.

14. The process for forming a composite part recited in claim 2, wherein said paper layer is adhesively bonded to said skins of sheet metal.

15. The process for forming a composite part recited in claim 2, wherein each of said skins has a thickness of from about 0.005 in. to about 0.030 in.

16. The process for forming a composite part recited in claim 2, wherein said paper layer has a thickness of at least about 0.01 in.

17. The process for forming a composite part recited in claim 2, wherein said paper layer has a thickness of from about 0.01 in. and 0.05 in.

18. The process for forming a composite part recited in claim 2, wherein including layers of adhesive disposed between said paper layer and each of said skin.

19. The process for forming a composite part recited in claim 2, wherein said sheet metal skins are zinc coated steel which has been cold rolled with zinc on the surface.

20. The process for forming a composite part recited in claim 2, wherein said metal skins are formed of low carbon micro-alloyed high-strength steel.

21. The process for forming a composite part recited in claim 2, wherein said paper layer is multiple layers.

* * * * *